US010186186B2

(12) United States Patent
Cheng et al.

(10) Patent No.: US 10,186,186 B2
(45) Date of Patent: Jan. 22, 2019

(54) ELECTRONIC PAPER DISPLAY AND METHOD FOR DRIVING ELECTRONIC PAPER DISPLAY PANEL

(71) Applicant: E Ink Holdings Inc., Hsinchu (TW)

(72) Inventors: Chih-Yu Cheng, Hsinchu (TW); Hsin-I Wu, Hsinchu (TW); Feng-Shou Lin, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 15/869,055

(22) Filed: Jan. 12, 2018

(65) Prior Publication Data

US 2018/0240390 A1 Aug. 23, 2018

(30) Foreign Application Priority Data

Feb. 20, 2017 (TW) ............................ 106105542 A

(51) Int. Cl.
*G06F 1/00* (2006.01)
*G09G 3/20* (2006.01)

(52) U.S. Cl.
CPC ... *G09G 3/2014* (2013.01); *G09G 2310/0243* (2013.01); *G09G 2310/0264* (2013.01)

(58) Field of Classification Search
CPC ... G09G 5/00; G09G 3/00; G09G 3/20; H03L 7/00
See application file for complete search history.

(56) References Cited

U.S. PATENT DOCUMENTS

| | | | | |
|---|---|---|---|---|
| 6,016,133 | A | 1/2000 | Nito et al. | |
| 6,201,529 | B1 | 3/2001 | Shimizu | |
| 8,362,991 | B2 | 1/2013 | Lee et al. | |
| 8,390,562 | B2 | 3/2013 | Chen et al. | |
| 2006/0192751 | A1 | 8/2006 | Miyasaka et al. | |
| 2010/0277453 | A1 | 11/2010 | Wang et al. | |
| 2011/0157149 | A1* | 6/2011 | Lee ...................... | G09G 3/3453 345/213 |
| 2016/0351097 | A1* | 12/2016 | Sato ...................... | G09G 3/344 |

FOREIGN PATENT DOCUMENTS

| | | |
|---|---|---|
| TW | 201120842 | 6/2011 |

* cited by examiner

*Primary Examiner* — Michael Faragalla
(74) *Attorney, Agent, or Firm* — JCIPRNET

(57) ABSTRACT

An electronic paper display including an electronic paper display panel and a driver circuit is provided. The electronic paper display panel is configured to display an image. The driver circuit is coupled to the electronic paper display panel. The driver circuit is configured to drive the electronic paper display panel to display the image by using a plurality of driving signals. Each of the driving signals includes a reset period and a display period. The display period includes a pulse driving period. The driving signals include a first driving signal and a second driving signal configured to drive the electronic paper display panel to display the image by using a pulse width modulation signal during the pulse driving period.

12 Claims, 3 Drawing Sheets

ELECTRONIC PAPER DISPLAY AND METHOD FOR DRIVING ELECTRONIC PAPER DISPLAY PANEL

CROSS-REFERENCE TO RELATED APPLICATION

This application claims the priority benefit of Taiwan application serial no. 106105542, filed on Feb. 20, 2017. The entirety of the above-mentioned patent application is hereby incorporated by reference herein and made a part of this specification.

BACKGROUND OF THE INVENTION

Field of the Invention

The invention relates to a display and a method for driving a display panel, and particularly relates to an electronic paper display and a method for driving an electronic paper display panel.

Description of Related Art

Since electronic paper display panel has advantages of light weight, durability and low power consumption that meets energy saving and environmental protection, it has been widely applied to electronic readers (for example, electronic books, electronic news papers) or other electronic devices (for example, electronic tags) in the market. In the existing technique, when a driver circuit of the electronic paper display drives an electronic paper display panel, the driver circuit generally drives the electronic paper display panel to first display a black color, a white color and a gray level portion, and then drives the electronic paper display panel to display a color portion. However, such method is liable to cause a blur phenomenon of the black color, the white color and the gray level portion due to the influence of a driving signal used for driving the electronic display panel to display the color portion, which decreases a display quality.

SUMMARY OF THE INVENTION

The invention is directed to an electronic paper display and a method for driving an electronic paper display panel, which are adapted to provide good display quality.

The invention provides an electronic paper display including an electronic paper display panel and a driver circuit. The electronic paper display panel is configured to display an image. The driver circuit is coupled to the electronic paper display panel. The driver circuit is configured to drive the electronic paper display panel to display the image by using a plurality of driving signals. Each of the driving signals includes a reset period and a display period. The display period includes a pulse driving period. The driving signals include a first driving signal and a second driving signal configured to drive the electronic paper display panel to display the image by using a pulse width modulation signal during the pulse driving period.

In an embodiment of the invention, the first driving signal drives the electronic paper display panel to display a black portion of the image. The second driving signal drives the electronic paper display panel to display a white portion of the image. The first driving signal and the second driving signal drive pixels of the electronic paper display panel in different signal levels within a same time interval of the pulse driving period.

In an embodiment of the invention, the first driving signal has a first signal level and a second signal level. The second driving signal has the second signal level and a third signal level. While the first driving signal drives the electronic paper display panel in the first signal level, the second driving signal drives the electronic paper display panel in the second signal level. While the first driving signal drives the electronic paper display panel in the second signal level, the second driving signal drives the electronic paper display panel in the third signal level.

In an embodiment of the invention, the driving signals further include a third driving signal. The third driving signal is configured to drive the electronic paper display panel to display a color portion of the image by using a direct current signal during the pulse driving period.

In an embodiment of the invention, the direct current signal has the second signal level.

In an embodiment of the invention, the display period further includes a pulse driving front period, and the pulse driving front period and the pulse driving period are sequentially arranged.

In an embodiment of the invention, when the pulse driving period is ended, the driver circuit ends the display period.

The invention provides a method for driving an electronic paper display panel including: driving the electronic paper display panel to display a black portion of an image by using a first driving signal during a pulse driving period; driving the electronic paper display panel to display a white portion of the image by using a second driving signal during the pulse driving period; and driving the electronic paper display panel to display a color portion of the image by using a third driving signal during the pulse driving period. During the pulse driving period, the first driving signal and the second driving signal include a pulse width modulation signal, and the third driving signal includes a direct current signal. Each of the first driving signal, the second driving signal and the third driving signal includes a reset period and a display panel. The display period includes the pulse driving period.

In an embodiment of the invention, the first driving signal and the second driving signal drive pixels of the electronic paper display panel in different signal levels within a same time interval of the pulse driving period.

In an embodiment of the invention, the first driving signal has a first signal level and a second signal level. The second driving signal has the second signal level and a third signal level. While the first driving signal drives the electronic paper display panel in the first signal level, the second driving signal drives the electronic paper display panel in the second signal level. While the first driving signal drives the electronic paper display panel in the second signal level, the second driving signal drives the electronic paper display panel in the third signal level.

In an embodiment of the invention, the direct current signal has the second signal level.

In an embodiment of the invention, the display period further includes a pulse driving front period, and the pulse driving front period and the pulse driving period are sequentially arranged.

In an embodiment of the invention, when the pulse driving period is ended, the display period is ended.

According to the above description, in the exemplary embodiments of the invention, the driving signals include the pulse driving period. During the pulse driving period, the first driving signal and the second driving signal include the pulse width modulation signal, and the third driving signal includes the direct current signal. By using such driving method to drive the electronic paper display panel, good display quality is provided.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
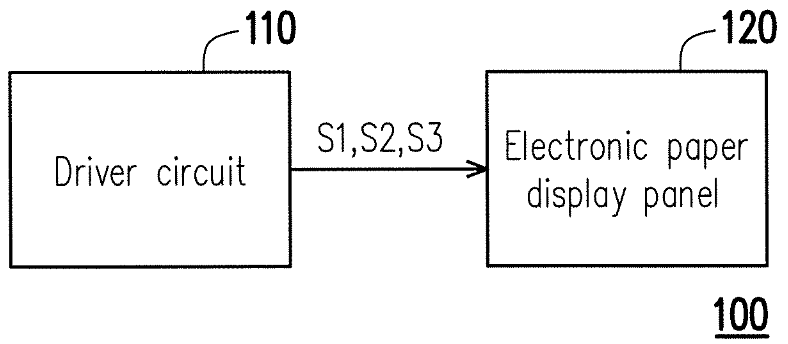
FIG. 1 is a schematic diagram of an electronic paper display according to an embodiment of the invention.
Figure 2:
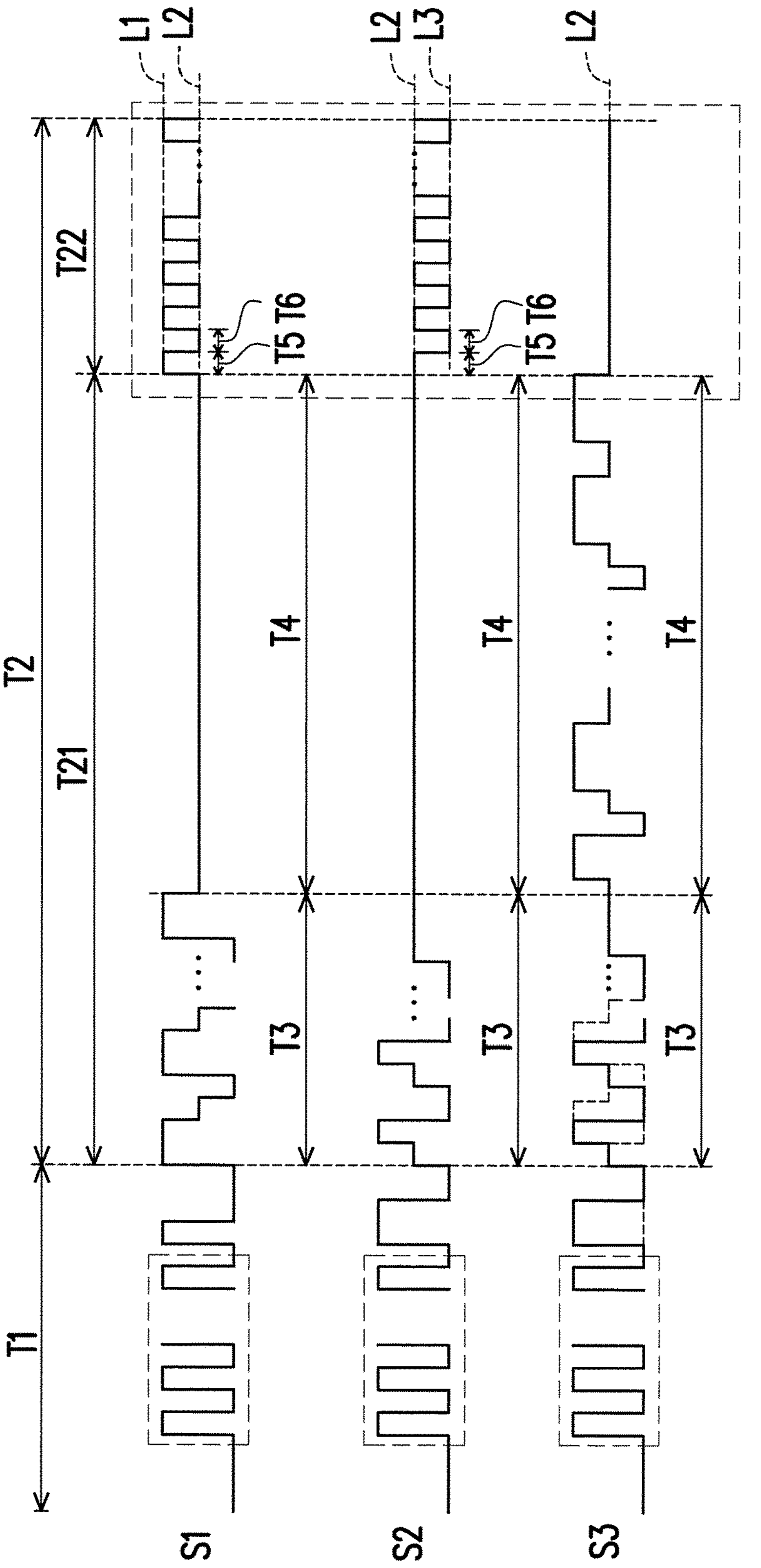
FIG. 2 is a waveform schematic diagram of driving signals according to the embodiment of FIG. 1.

FIG. 1 is a schematic diagram of an electronic paper display according to an embodiment of the invention. FIG. 2 is a waveform schematic diagram of driving signals according to the embodiment of FIG. 1. Referring to FIG. 1 and FIG. 2, the electronic paper display 100 of the present embodiment includes an electronic paper display panel 120 and a driver circuit 110. The electronic paper display panel 120 is configured to display a color image including, for example, a black portion, a white portion and a color portion. The driver circuit 110 is coupled to the electronic paper display panel 120. The driver circuit 110 is configured to drive the electronic paper display panel 120 to display an image by using a plurality of driving signals shown in FIG. 2. In the present embodiment, the driver circuit 110, for example, includes a timing controller used for driving the electronic paper display panel 120 or an electronic circuit used for generating the driving signals according to the timing controller.

In the present embodiment, the driving signals include a first driving signal S1, a second driving signal S2 and a third driving signal S3. Each of the driving signals includes a reset period T1 and a display period T2. The display period T2 includes a pulse driving front period T21 and a pulse driving period T22. In the present embodiment, the pulse driving front period T21 and the pulse driving period T22 are sequentially arranged. When the pulse driving period T22 is ended, the driver circuit 110 ends the display period T2. Each of the driving signals resets image data displayed in a previous stage by the pixels of the electronic paper display panel 120 during the reset period T1. During the display period T2, each of the driving signals drives the pixels of the electronic paper display panel 120 to display a corresponding image according to current image data. In the present embodiment, the first driving signal S1 is, for example, configured to drive the pixels of the electronic paper display panel 120 to display the black portion (including a black color and a gray color) of the image. The second driving signal S2 is, for example, configured to drive the pixels of the electronic paper display panel 120 to display the white portion of the image. The third driving signal S3 is, for example, configured to drive the pixels of the electronic paper display panel 120 to display the color portion of the image.

In the present embodiment, the pulse driving front period T21 includes a first driving period T3 and a second driving period T4. During the first driving period T3, the first driving signal S1 and the second driving signal S2 respectively drive the pixels of the electronic paper display panel 120 to display the black color and the white color by using a predetermined signal waveform. During the second driving period T4, the first driving signal S1 and the second driving signal S2 are maintained to a second signal level. On the other hand, during the first driving period T3, the third driving signal S3 drives the electronic paper display panel 120 by using a signal waveform similar to that of the first driving signal S1 or the second driving signal S2. During the second driving period T4, the third driving signal S3 drives the pixels of the electronic paper display panel 120 to display the corresponding color by using a predetermined signal waveform according to the image data.

In the present embodiment, during the pulse driving period T22, the first driving signal S1 and the second driving signal S2 include a pulse width modulation (PWM) signal, and the third driving signal S3 includes a direct current (DC) signal. During the pulse driving period T22, the driver circuit 110 respectively drives the pixels of the electronic paper display panel 120 to display the black color or the white color by using the PWM signal. In the present embodiment, a frequency and a pulse width of the PWM signal can be adjusted according to a design requirement, which is not limited by the invention. During the pulse driving period T22, the driver circuit 110 drives the pixels of the electronic paper display panel 120 to display a predetermined color by using the DC signal. In the present embodiment, the driving waveforms of the driving signals (S1 to S3) during the reset period T1 and the pulse driving front period T21 can be adjusted according to different panel designs, which are not limited by the invention.

In the present embodiment, during the pulse driving period T22, the first driving signal S1 has a first signal level L1 and a second signal level L2. The second driving signal S2 has the second signal level L2 and a third signal level L3. The third driving signal S3 has the second signal level L2, i.e. the DC signal has the second signal level L2. The first signal level L1 is higher than the second signal level L2. The second signal level L2 is higher than the third signal level L3. In the present embodiment, the second signal level L2 is, for example, a zero potential, though the invention is not limited thereto.

In the present embodiment, the first driving signal S1 and the second driving signal S2 drive the pixels of the electronic paper display panel 120 in different signal levels within a same time interval of the pulse driving period T22. For example, during the third driving period T5, while the first driving signal S1 drives the electronic paper display panel 120 in the first signal level L1, the second driving signal S2 drives the electronic paper display panel 120 in the second signal level L2. During the fourth driving period T6, while the first driving signal Si drives the electronic paper display panel 120 in the second signal level L2, the second driving signal S2 drives the electronic paper display panel 120 in the third signal level L3.

Figure 3:
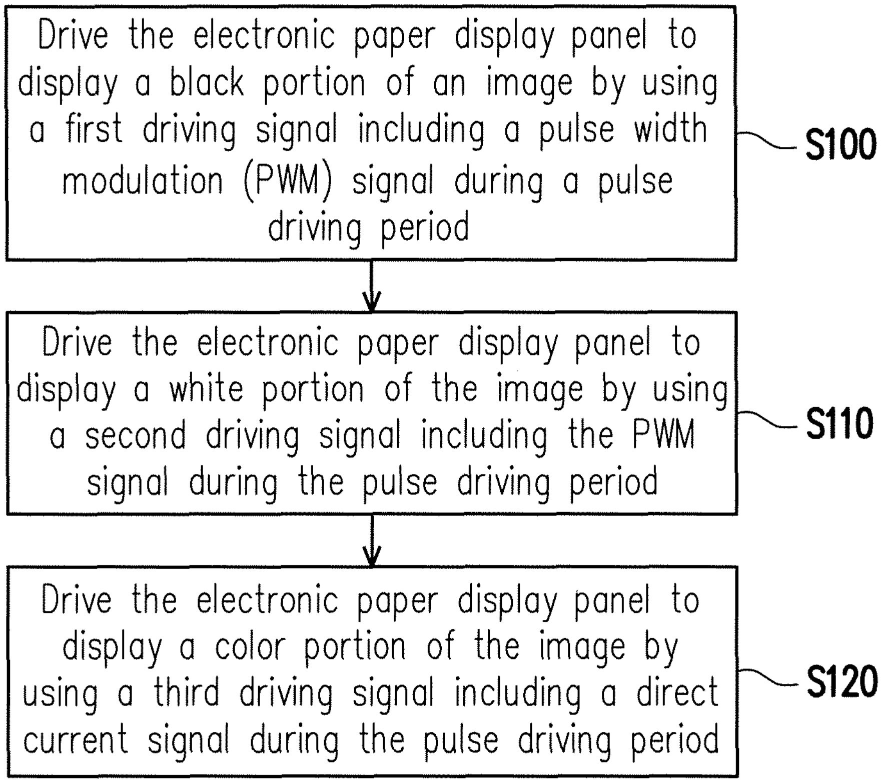
FIG. 3 is a flowchart illustrating a method for driving an electronic paper display panel according to an embodiment of the invention.

FIG. 3 is a flowchart illustrating a method for driving an electronic paper display panel according to an embodiment of the invention. Referring to FIG. 1 and FIG. 3, the driving method of the present embodiment is at least adapted to the electronic paper display 100 of FIG. 1, though the invention is not limited thereto. Taking the electronic paper display 100 of FIG. 1 as an example, in step S100, during the pulse driving period T22, the driver circuit 110 drives the electronic paper display panel 120 to display the black portion of the image by using the first driving signal S1. In step S110, during the pulse driving period T22, the driver circuit 110 drives the electronic paper display panel 120 to display the white portion of the image by using the second driving signal S2. In step S120, during the pulse driving period T22, the driver circuit 110 drives the electronic paper display panel 120 to display the color portion of the image by using the third driving signal S3. In the present embodiment, the third driving signal S3 drives the color portion of the image by using the DC signal. In the present embodiment, during the pulse driving period T22, the first driving signal Si and the second driving signal S2 include the PWM signal shown in FIG. 2, and the third driving signal S3 includes the DC signal shown in FIG. 2. In another embodiment of the invention, the sequence of the step S100 and the step S110 are reversed, i.e. the white portion of the image is first driven, and then the black portion of the image is driven. In another embodiment of the invention, during the pulse driving period T22, a pulse width of the first driving signal S1 and the second driving signal S2 is preferably the shortest pulse width that can be output by the driver circuit 110.

Moreover, enough instructions and recommendations for the method for driving the electronic paper display panel of the present embodiment can be learned from description of the embodiment of FIG. 1 and FIG. 2, so that detail thereof is not repeated.

In summary, in the exemplary embodiments of the invention, the driver circuit drives the electronic paper display panel to display the black, white and gray level portion of the image during the first driving period of the pulse driving front period. Then, the driver circuit drives the electronic paper display panel to display the color portion of the image during the second driving period of the pulse driving front period. After the pulse driving front period, the display period further includes the pulse driving period. During the pulse driving period, the driver circuit drives the electronic paper display panel to display the black, white and gray level portion of the image by using the PWM signal, and the DC signal is maintained for the color portion. Therefore, the driving method of the invention may avoid the blur phenomenon of the black color, the white color and the gray level portion of the image caused by the influence of the driving signal of the second driving period. Moreover, the frequency and the pulse width of the PWM signal can be adjusted according to a design requirement, so as to improve image clarity.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An electronic paper display, comprising:

an electronic paper display panel, configured to display an image; and a driver circuit, coupled to the electronic paper display panel, and configured to drive the electronic paper display panel to display the image by using a plurality of driving signals, wherein each of the driving signals comprises a reset period and a display period, the display period comprises a pulse driving period, and the driving signals comprise a first driving signal and a second driving signal configured to drive the electronic paper display panel to display the image by using a pulse width modulation signal during the pulse driving period, wherein the first driving signal drives the electronic paper display panel to display a black portion of the image, the second driving signal drives the electronic paper display panel to display a white portion of the image, and the first driving signal and the second driving signal drive pixels of the electronic paper display panel in different signal levels within a same time interval of the pulse driving period.

2. The electronic paper display as claimed in claim 1, wherein the first driving signal has a first signal level and a second signal level, the second driving signal has the second signal level and a third signal level, while the first driving signal drives the electronic paper display panel in the first signal level, the second driving signal drives the electronic paper display panel in the second signal level, and while the first driving signal drives the electronic paper display panel in the second signal level, the second driving signal drives the electronic paper display panel in the third signal level.

3. The electronic paper display as claimed in claim 2, wherein the driving signals further comprise a third driving signal configured to drive the electronic paper display panel to display a color portion of the image by using a direct current signal during the pulse driving period.

4. The electronic paper display as claimed in claim 3, wherein the direct current signal has the second signal level.

5. The electronic paper display as claimed in claim 1, wherein the display period further comprises a pulse driving front period, and the pulse driving front period and the pulse driving period are sequentially arranged.

6. The electronic paper display as claimed in claim 5, wherein when the pulse driving period is ended, the driver circuit ends the display period.

7. A method for driving an electronic paper display panel, comprising:

driving the electronic paper display panel to display a black portion of an image by using a first driving signal during a pulse driving period; wherein the first driving signal comprises a pulse width modulation signal during the pulse driving period;

driving the electronic paper display panel to display a white portion of the image by using a second driving signal during the pulse driving period, wherein the second driving signal comprises the pulse width modulation signal during the pulse driving period; and driving the electronic paper display panel to display a color portion of the image by using a third driving signal during the pulse driving period, wherein the third driving signal comprises a direct current signal during the pulse driving period, wherein each of the first driving signal, the second driving signal and the third driving signal comprises a reset period and a display panel, and the display period comprises a pulse driving period.

8. The method for driving the electronic paper display panel as claimed in claim 7, wherein the first driving signal and the second driving signal drive pixels of the electronic paper display panel in different signal levels within a same time interval of the pulse driving period.

9. The method for driving the electronic paper display panel as claimed in claim 8, wherein the first driving signal has a first signal level and a second signal level, the second driving signal has the second signal level and a third signal level, while the first driving signal drives the electronic paper display panel in the first signal level, the second driving signal drives the electronic paper display panel in the second signal level, and while the first driving signal drives the electronic paper display panel in the second signal level, the second driving signal drives the electronic paper display panel in the third signal level.

10. The method for driving the electronic paper display panel as claimed in claim 9, wherein the direct current signal has the second signal level.

11. The method for driving the electronic paper display panel as claimed in claim 7, wherein the display period further comprises a pulse driving front period, and the pulse driving front period and the pulse driving period are sequentially arranged.

12. The method for driving the electronic paper display panel as claimed in claim 11, wherein when the pulse driving period is ended, the display period is ended.

* * * * *